United States Patent [19]

Hosoya

[11] Patent Number: 5,796,692
[45] Date of Patent: Aug. 18, 1998

[54] DATA REPRODUCING METHOD AND APPARATUS FOR DETERMINING THE INTERVAL BETWEEN PITS ON A RECORDING MEDIUM FROM A MODULATED READ-OUT SIGNAL

[75] Inventor: Hideki Hosoya, Yokohama, Japan

[73] Assignee: Canon Kabushiki Kaisha, Tokyo, Japan

[21] Appl. No.: 388,988

[22] Filed: Feb. 15, 1995

Related U.S. Application Data

[62] Division of Ser. No. 296,852, Aug. 25, 1994, Pat. No. 5,408,456, which is a continuation of Ser. No. 649,730, Feb. 1, 1991, abandoned.

[30] Foreign Application Priority Data

| Feb. 2, 1990 | [JP] | Japan | 2-22050 |
| Feb. 2, 1990 | [JP] | Japan | 2-22051 |
| Feb. 20, 1990 | [JP] | Japan | 2-22049 |
| Apr. 4, 1990 | [JP] | Japan | 2-88396 |

[51] Int. Cl.$^6$ ............................................... G11B 7/00
[52] U.S. Cl. ............................ 369/59; 369/58; 369/48
[58] Field of Search ............................ 369/59, 47, 48, 369/49, 54, 58, 109, 116, 275.3, 275.4

[56] References Cited

U.S. PATENT DOCUMENTS

| 3,274,582 | 9/1966 | Gibson | 340/347 |
| 4,998,237 | 3/1991 | Osakabe et al. | 369/109 |
| 5,084,852 | 1/1992 | Bailey | 369/59 |
| 5,097,459 | 3/1992 | Yoshio | 369/48 |
| 5,327,411 | 7/1994 | Iwasa et al. | 369/59 |

FOREIGN PATENT DOCUMENTS 2122408  1/1984  United Kingdom .

*Primary Examiner*—Muhammad N. Edun
*Attorney, Agent, or Firm*—Fitzpatrick, Cella, Harper & Scinto

[57] ABSTRACT

A signal converting method comprises the steps of converting the continuation of a binary signal representative of data into the continuation of blocks including a binary signal of at least two bits, converting the continuation of the blocks into the continuation of a ternary or higher signal, the blocks differing in the data arrangement therein from each other corresponding to the different bits of the signal level of the ternary or higher signal, and substituting, if a predetermined number of bits indicative of the same signal level continue in the continuation of the ternary or higher signal, a special bit having a signal level differing from the signal level of any other bit for the last one of the predetermined number of bits.

9 Claims, 10 Drawing Sheets

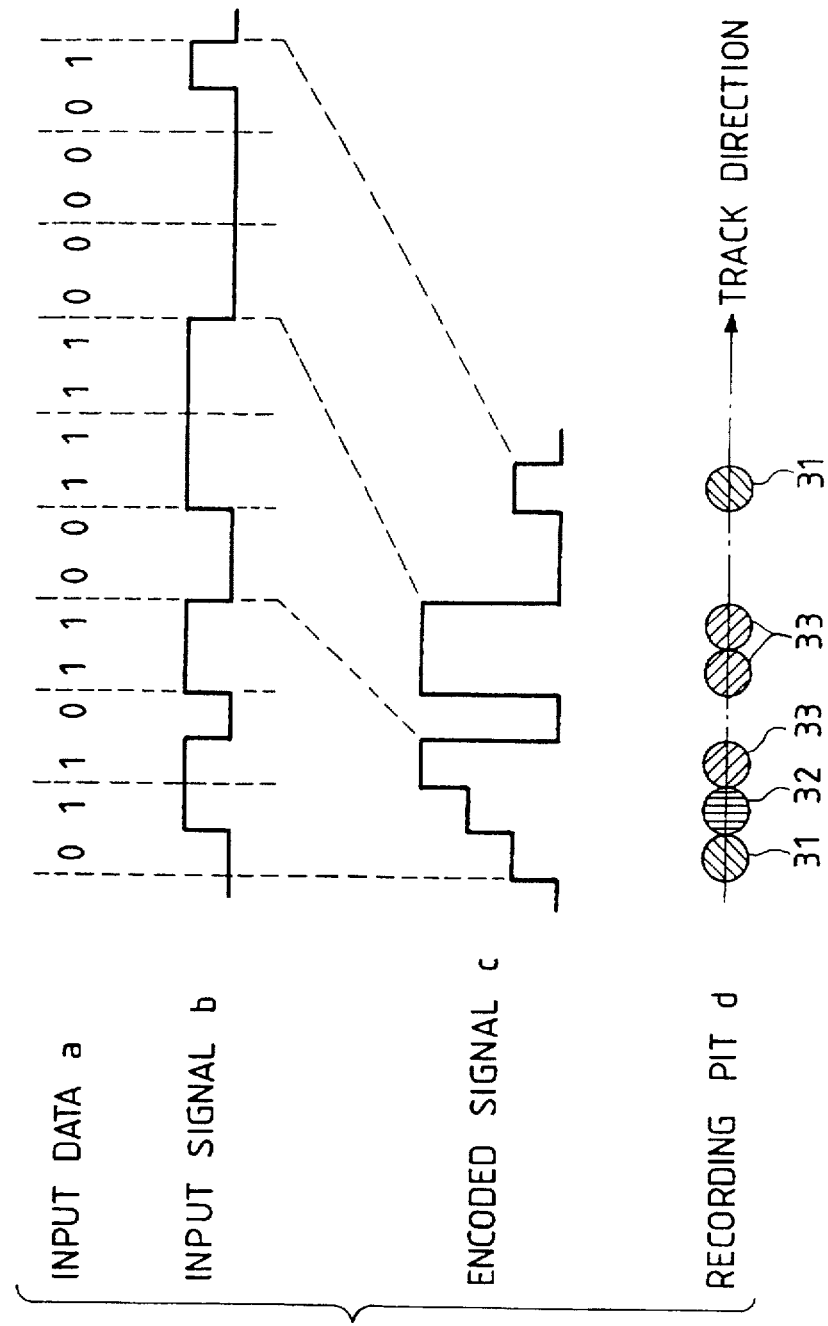

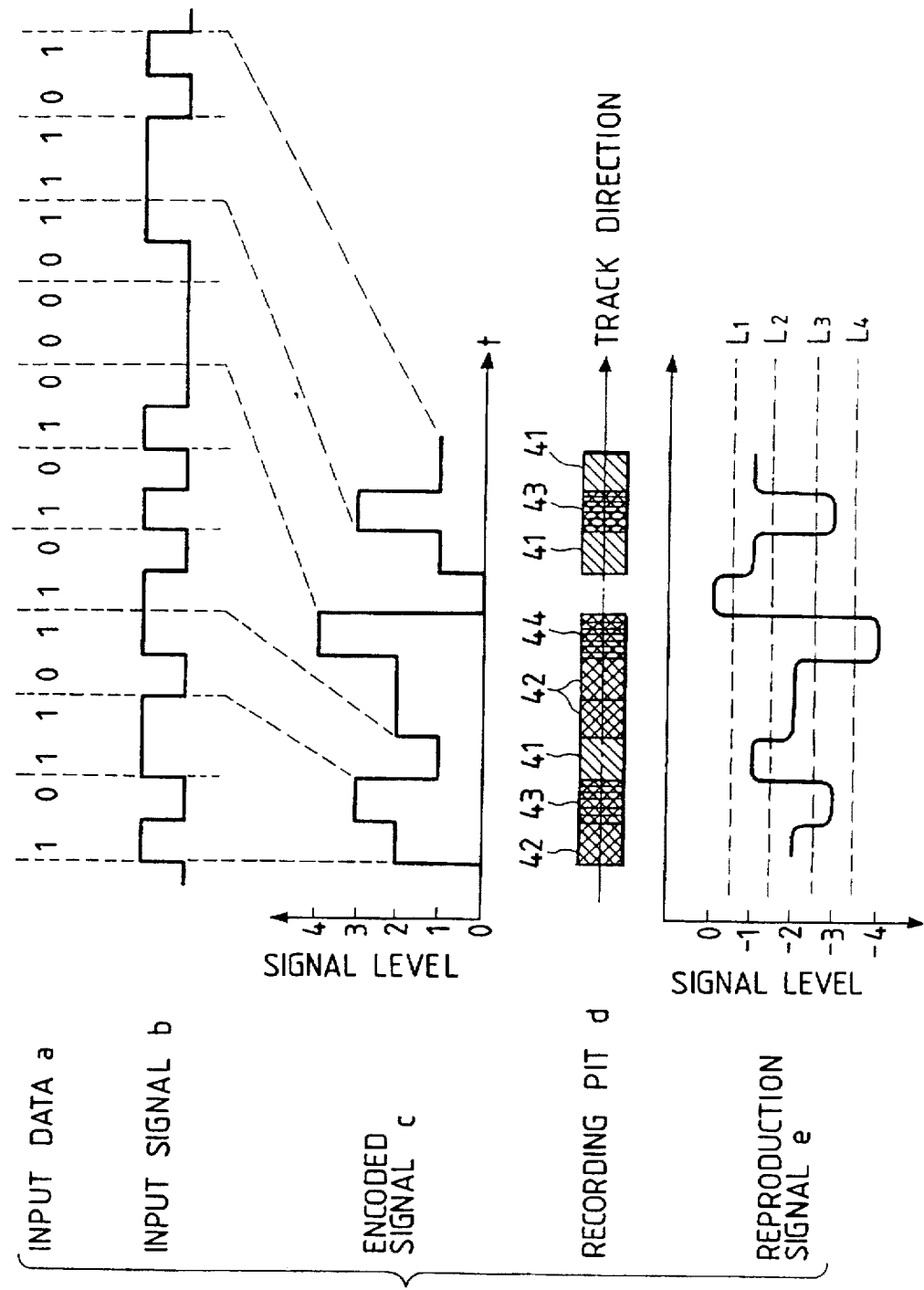

FIG. 11A INPUT DATA a
FIG. 11B INPUT SIGNAL b
FIG. 11C ENCODED SIGNAL c
FIG. 11D RECORDING PIT d
FIG. 11E REPRODUCTION SIGNAL e

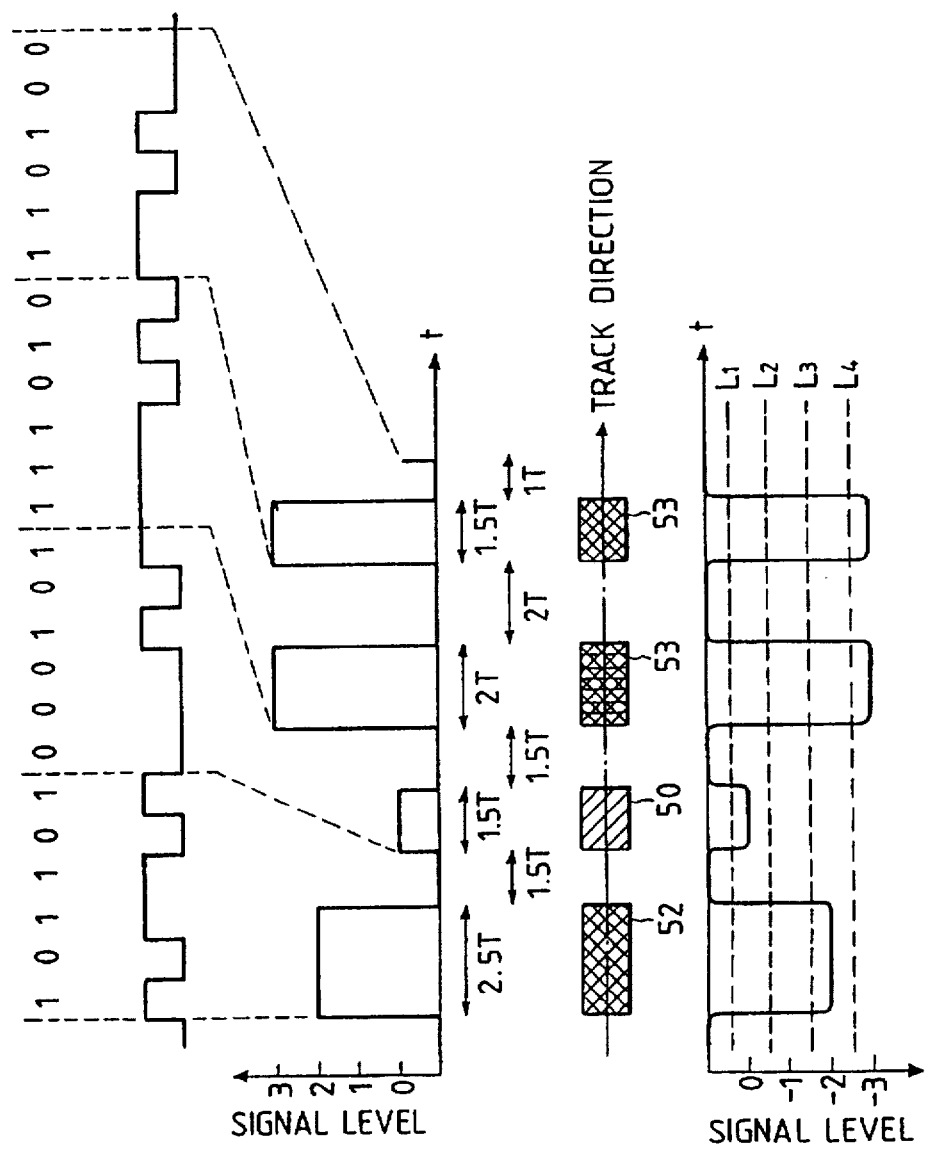
FIG. 13A INPUT DATA a
FIG. 13B INPUT SIGNAL b
FIG. 13C ENCODED SIGNAL c
FIG. 13D RECORDING PIT d
FIG. 13E REPRODUCTION SIGNAL e

DATA REPRODUCING METHOD AND APPARATUS FOR DETERMINING THE INTERVAL BETWEEN PITS ON A RECORDING MEDIUM FROM A MODULATED READ-OUT SIGNAL

This application is a divisional of application, Ser. No. 08/296,852 filed Aug. 25, 1994, now U.S. Pat. No. 5,408,456, which application is a continuation of prior application, Ser. No. 07/649,730 filed Feb. 1, 1991, now abandoned.

BACKGROUND OF THE INVENTION

1. Field of the Invention

This invention relates to a method of converting a binary signal representative of data into a ternary or higher signal. The signal thus converted is recorded as the arrangement of pits on a recording medium such as an optical disk and is used to accumulate the data.

2. Related Background Art

Optical recording mediums capable of recording data by-the use of light and reading out the recorded data have, for example, a disk-like shape, a card-like shape, a tape-like shape or the like. These optical recording mediums include ones capable of recording and reproduction and ones capable of only reproduction.

The recording of data on such a medium is accomplished by stopping down a light beam modulated in accordance with a data signal into a minute spot, and scanning an information track formed on the medium by this light beam. By the application of the light beam, a row of pits representative of data is formed on the information track. Each pit differs in optical density from the other portions or is more recessed than the other portions and therefore is optically detectable. Also, the data thus recorded as a row of pits on the medium is read out by scanning the information track by a light beam having a predetermined power and detecting the reflected light thereof or the transmitted light thereof. During the recording and reproduction of such data, the spot diameter of the light beam applied onto the medium is controlled by auto-focusing (AF) control means. On the other hand, the application position of the light beam is controlled by auto-tracking (AT) control means so that the light beam may accurately scan the information track.

The signal recorded as described above usually is a binary signal. That is, the pits correspond to data "1" and the portions on which the pits are not formed correspond to data "0". To enhance the recording density of the medium in such a recording method, the dimensions of the pits and the intervals between the pits can be made small. However, the spot diameter of said light beam is naturally limited. Therefore, there have been limitations in making the dimensions of and the intervals between the pits recorded by the light beam small. This has been an obstacle to increasing the data containing capacity of the recording medium.

On the other hand, a method for solving the above-noted problem is proposed in British Patent No. 2,122,408, for example. In this method, data is converted into a ternary or higher signal and the converted signal is recorded as an arrangement of two or more kinds of pits on the medium. An example of such a method will hereinafter be described.

FIG. 1 of the accompanying drawings is a schematic diagram showing an optical data recording apparatus for recording data by the above-described method, and reproducing the recorded data. In FIG. 1, the reference numeral 25 designates an optical disk which is an optical recording medium. This optical disk 25 is clamped on a turntable 26 and rotated by a spindle motor 27. A light beam is applied to the rotated optical disk 25 by an optical head. This light beam is emitted from a semiconductor laser 14 contained in the optical head and is made into a parallel beam by a collimator lens 15. This parallel beam is transmitted through a beam splitter 16 and is condensed into a minute spot on the optical disk 25 and applied to the optical disk. The light reflected by the optical disk 25 is reflected by the beam splitter 16 and passes through a sensor lens 18 and is received by a photodetector 19.

During the recording of data, data represented by a binary signal is input to a buffer memory 20. The signal stored in the buffer memory 20 is supplied to an encoding circuit 21 at each block of a predetermined unit and is converted into a quaternary signal. The converted signal is supplied to a laser drive circuit 22. The laser drive circuit 22 drives the semiconductor laser 14 in conformity with this signal, and causes the laser 14 to emit a light beam intensity-modulated in accordance with this signal.

During the reproduction of the data, the laser drive circuit 22 causes a light beam of predetermined intensity to be emitted from the semiconductor laser. This light beam scans the row of pits recorded on the information track of the optical disk 25. The reflected light subjected to modulation by the row of pits is converted into an electrical signal by the photodetector 19. The output signal of the photodetector 19 is converted into a binary data signal by a decoding circuit 23. The data signal output from the decoding circuit 23 is once stored in a buffer memory 24 and thereafter taken out as an output signal.

The optical disk 25 has the characteristic that the optical density thereof varies as shown in FIG. 2 of the accompanying drawings in conformity with the power of the light beam applied thereto. When the power of the light beam is below the threshold value A, the optical density does not vary and no pit is formed on the disk. When the power of the light beam is between the value indicated by A and the value indicated by B, the optical density becomes greater, though non-linearly, with an increase in the power. If the power exceeds the value indicated by B, the optical density does not vary any more. That is, the area exceeding the value B is a so-called saturation area. In the aforedescribed method, the power of the light beam is varied over several stages between the value A and the value B, whereby a plurality of kinds of pits differing in optical density are formed on the medium. The level of signals reproduced from such pits becomes greater with an increase in the optical density. Accordingly, by comparing the level of the reproduced signals with several reference values, the kinds of the pits can be discriminated.

As described above, the use of a plurality of kinds of pits enables a multi-value (ternary or higher) signal to be recorded. Thereby, data can be recorded with high density on the recording medium. When, for example, N recorded states are made, high density of $\log_2 N$ times can be achieved.

As the material of the medium whose optical density varies in conformity with the power of the applied light beam as described above, mention may be made, for example of, organic coloring matter dye such as cyanine or azelene of polymethylene. Also, instead of recording pits differing in optical density, pits may be formed in the form of depressions and the depth of the depressions may be varied, as proposed in the aforementioned British Patent No. 2,122,408.

FIG. 3 of the accompanying drawings illustrates an example of a method of converting a binary signal into a quaternary signal and recording it on a medium. In FIG. 3, data indicated by a is input as a binary signal indicated by b to the buffer memory 20 of FIG. 1. This binary signal is converted into a quaternary signal indicated by c, by the encoding circuit 21. By a light beam modulated in conformity with this signal c being applied to the medium, pits indicated by d are recorded on the medium. The reference numeral 31 designates pits corresponding to a first signal level, the reference numeral 32 denotes a pit corresponding to a second signal level, and the reference numeral 33 designates pits corresponding to a third signal level.

In the present example, two bits of the data correspond to one pit. That is, the pits 31 represent data "01", the pit 32 represents data "10", the pits 33 represent data "11", and the portions in which no pit is formed represent data "00". Accordingly, the binary data represented by (123033001) of the quaternary signal recorded by the pits is (011011001111000001).

The pits recorded as indicated by d in FIG. 3 are reproduced as a signal of such a waveform as shown in FIG. 4 of the accompanying drawings. It is because there is a constriction in the portion wherein the pits are in contact with each other that in the portion wherein "3" is continuous, a small depression is created in the reproduced signal. By comparing this reproduced signal with a plurality of slice levels, the value indicated by each pit can be discriminated. Also, the edge of each pit can be detected from the point of intersection between the reproduced signal and each slice level. This edge detection signal is used to produce a clock signal, and the reproduction of the data is effected in synchronism with this clock signal.

However, in the prior-art method as described above, there has been the problem that if a number of pits indicative of the same value are continuous, the edges of these pits cannot be detected and the production of a clock signal becomes difficult.

SUMMARY OF THE INVENTION

It is an object of the present invention to solve the above-noted problem peculiar to the prior art and to provide a signal converting method for use in a recording method which can record data with high density and can stably detect a clock signal.

The above object of the present invention is achieved by a signal converting method comprising the steps of:

converting the continuation of a binary signal representative of data into the continuation of blocks including a signal of at least two bits;

converting the continuation of said blocks into the continuation of a ternary or higher signal, the blocks differing in the data arrangement therein from each other corresponding to the different bits of the signal level of the ternary or higher signal; and substituting, if a predetermined number of bits indicative of the same signal level continue in the continuation of said ternary or higher signal, a special bit having a signal level differing from the signal level of any other bit for the last one of said predetermined number of bits.

A signal converting method according to another embodiment of the present invention comprises the steps of:

converting the continuation of a binary signal representative of data into the continuation of blocks including a signal of at least two bits; and converting the continuation of said blocks into a signal in which pulses varying in the signal level and length thereof are arranged at predetermined intervals;

the blocks differing in the data arrangement therein from each other corresponding to the pulses differing in at least one of the signal level and length thereof.

A signal converting method according to still another embodiment of the present invention comprises the steps of:

converting the continuation of a binary signal representative of data into the continuation of blocks including a signal of at least two bits; and converting the continuation of said blocks into a signal in which pulses of a predetermined length whose signal level varies are arranged at varying intervals;

the blocks differing in the data arrangement therein from each other corresponding to the pulses differing in at least one of the signal level thereof and the interval from that pulse to the next pulse.

A signal converting method according to yet still another embodiment of the present invention comprises the steps of:

converting the continuation of a binary signal representative of data into the continuation of blocks including a signal of at least two bits; and converting the continuation of said blocks into a signal in which pulses varying in the signal level and length thereof are arranged at varying intervals;

the blocks differing in the data arrangement therein from each other corresponding to the pulses differing in at least one of the signal level and length thereof and the interval from that pulse to the next pulse.

BRIEF DESCRIPTION OF THE DRAWINGS

FIG. 3 illustrates a data recording method according to the prior art.

FIG. 5 illustrates a first embodiment of the data recording method of the present invention.

FIGS. 8 through 8E illustrate a second embodiment of the data recording method of the present invention.

FIGS. 11 through 11E illustrate a third embodiment of the data recording method of the present invention.

FIGS. 13A through 13B illustrate a fourth embodiment of the data recording method of the present invention.

DESCRIPTION OF THE PREFERRED EMBODIMENTS

Figure 1:
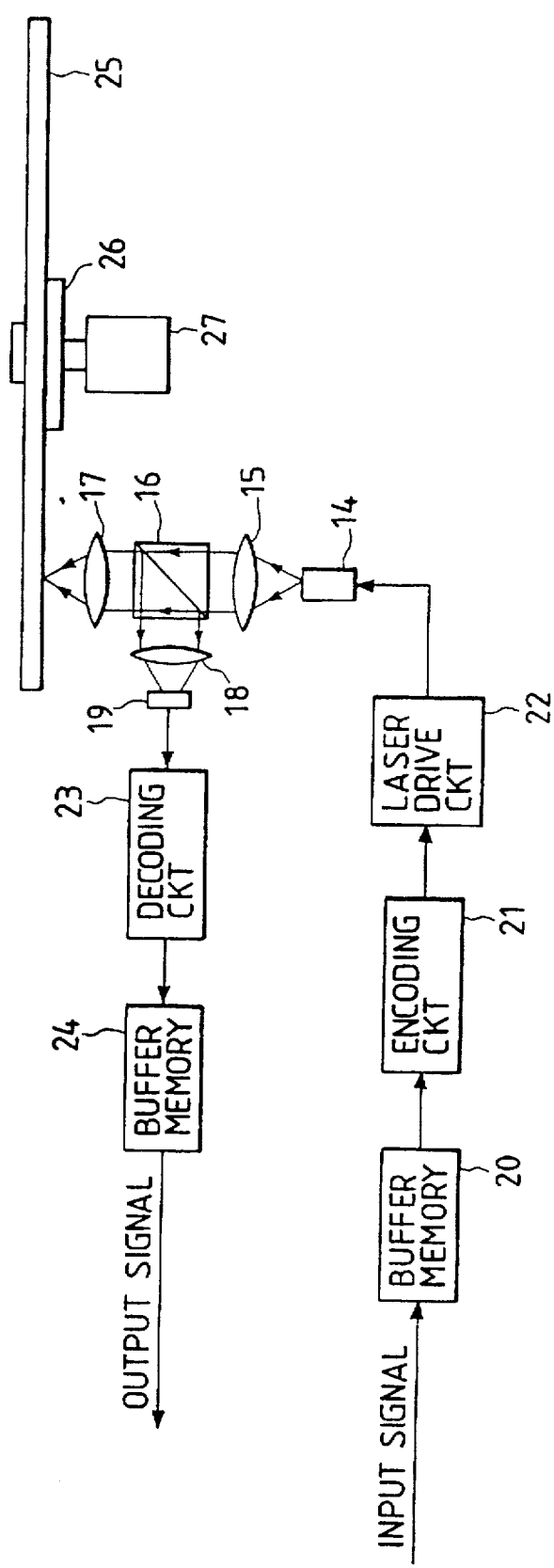
FIG. 1 is a schematic diagram showing an example of the construction of an optical data recording apparatus.
Figure 2:
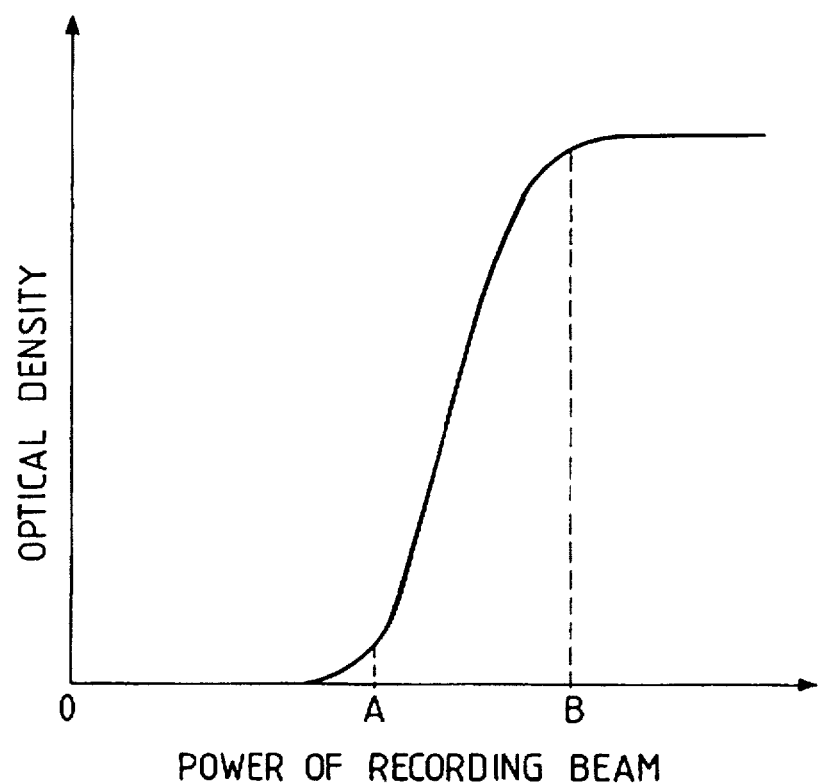
FIG. 2 is a graph showing a variation in optical density for the power of an applied light beam in a recording medium capable of multi-value recording.
Figure 4:
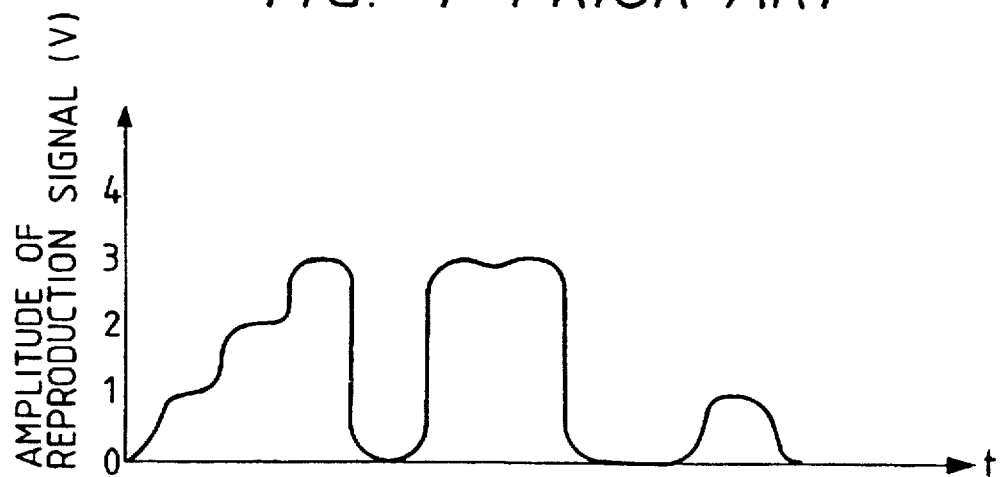
FIG. 4 shows the waveform of a signal reproduced from pits recorded by the prior art method.

FIG. 5 illustrates a first embodiment of the data recording method of the present invention. In FIG. 5, the reference character a designates an example of binary data recorded on a recording medium. This data is represented by a binary signal as indicated by b. In the present embodiment, this binary signal is converted into a pentamerous signal as indicated by c. At this time, two bits of the data a are converted into one bit of the signal c in accordance with a predetermined conversion rule. If the signal levels of the signal c are represented by "0", "1", "2", "3" and "4" in order from the lower one, the binary data "00" of two bits corresponds to the level "0" of the signal c. Likewise, data "01" corresponds to the level "1", data "10" corresponds to the level "2", and data "11" corresponds to the level "3". The level "4" of the signal c is not used in the ordinary conversion rule, and is treated as a special bit when a predetermined number of signals of the same level continue in the signal c. For example, in FIG. 5, the binary data "10110110101000011101", if converted into quaternary data, becomes "2312220131". However, since three bits of the level "2" continue, the bit of the third level "2" is substituted for by the bit of the level "4" which is a special bit. Therefore, the converted data is represented by "2312240131".

The signal converted as described above is recorded as the continuation of pits as indicated by d on an optical recording medium by scanning this medium by a light beam intensity-modulated in conformity with this signal. Here, the reference numeral 41 designates pits corresponding to the signal of the level "1", the reference numeral 42 denotes pits corresponding to the signal of the level "2", the reference numeral 43 designates pits corresponding to the signal of the level "3", and the reference numeral 44 denotes a pit corresponding to the signal of the level "4". At the level "0", no pit is formed on the medium and the portion in which no pit is formed is the unrecorded area between pits.

The pits 41–44, as previously described with respect to the prior art, have different optical densities or different pit depths and can be optically discriminated therebetween. When, for example, a signal track comprising this pit row is scanned by a light beam of predetermined intensity and the reflected light thereof is detected by a photodetector, there is obtained a reproduction signal as indicated by e in FIG. 5. Here is shown a case where the greater the signal level becomes during recording, the lower is the reflectance of the bit recorded at that signal level. This reproduction signal e is compared with four slice levels $L_1$–$L_4$, whereby it is converted into quaternary data. When the level of the reflected light of the unrecorded area is defined as 0, the slice levels $L_1$, $L_2$, $L_3$ and $L_4$ have values of −0.5, −1.5, −2.5 and −3.5, respectively. For example, a bit lower in signal level than the level $L_1$ and higher in signal level than any of the levels $L_2$–$L_4$ is discriminated as data "1". Also, a signal lower in signal level than the slice level $L_4$ is discriminated as a special bit corresponding to data "4".

The quaternary data reproduced as described above is converted into the original binary data in accordance with the conversion rule during recording. The data "4" represents the last bit when the same bits continue and therefore, is substituted for by the preceding bit, i.e., the data "2", and is converted into binary data "10". The result of the comparison between the reproduction signal e and the slice levels is used to produce a clock signal. Even if at this times the same bits continue, one of a predetermined number of bits is converted into a special bit and therefore the boundary with the bit preceding that bit is detected and thus, a clock signal can be obtained stably. In the present embodiment, two bits of a binary signal are recorded as one pit on the medium and therefore, there can be obtained recording density substantially twice as high as that obtained by the prior art binary recording method.

Figure 6:
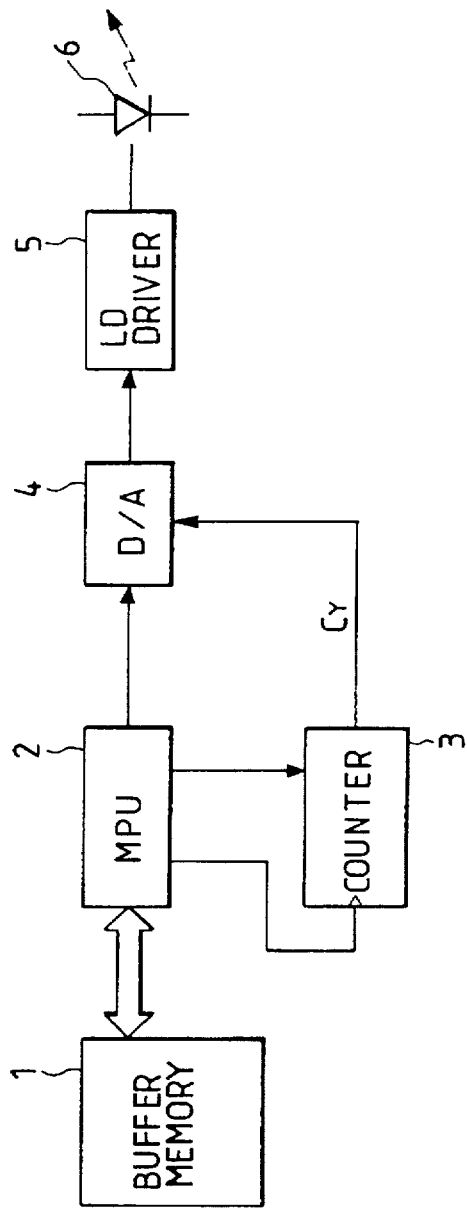
FIG. 6 is a block diagram showing the encoding circuit of a data recording apparatus used in the method illustrated in FIG. 5.

FIG. 6 is a block diagram showing an example of the construction of the encoding circuit of a data recording apparatus for carrying out the data recording method described with reference to FIG. 5. In this data recording apparatus, the portions other than the circuit shown in FIG. 6 can be of a construction similar to that shown in FIG. 1. That is, if the encoding circuit 21 of FIG. 1 is replaced by a microprocessor unit (MPU) 2, a counter 3 and a digital/analog (D/A) converter 4, the data recording method described with reference to FIG. 5 can be carried out by the apparatus of FIG. 1.

In FIG. 6, the binary signal indicated by b in FIG. 5 is input to a buffer memory 1 and is temporarily accumulated therein. The signal preserved in the buffer memory 1 is divided by the MPU 2 into blocks including two bits, and each block is converted into a quaternary signal by the D/A converter 4 in accordance with a predetermined conversion rule and is output therefrom.

On the other hand, if in the continuation of the blocks input from the buffer memory 1, the blocks identical in data arrangement continue, the MPU 2 outputs a clock pulse to the down counter 3. The down counter 3, when its count value becomes zero, outputs a carry signal Cy to the D/A converter 4. When this carry signal Cy is input to the D/A converter 4, the D/A converter 4 inputs an analog value of the level "4" to an LD driver 5 without resorting to the data sent from the MPU 2. The LD driver 5 drives a semiconductor laser 6 in accordance with the signal as indicated by c in FIG. 5 which is input from the D/A converter 4, and causes the semiconductor laser 6 to apply to the recording medium a light beam modulated in conformity with the signal c.

The specific operation of the present embodiment will hereinafter be described.

The MPU 2 first loads "2" into the counter circuit 3 before it takes out the first data block from the buffer memory 1. The MPU 2 then takes out data from the buffer memory 1 at each two bits. The data thus taken out is input to the D/A converter 4 for a time corresponding to one bit width and is converted into a quaternary signal thereby. On the other hand, the data taken out from the buffer memory 1 is stored in the internal register of the MPU 2. When the data next to that data is taken out, the MPU 2 compares it with the data stored in the internal register, and if these data are coincident with each other, the MPU 2 outputs one clock pulse to the counter circuit 3. By this pulse being input, the count value of the counter circuit 3 becomes "1". Further, if the next taken-out data is the same as the data stored in the internal register of the MPU 2, the MPU 2 again output a clock pulse to the counter circuit 3. Thereupon, the count value of the counter circuit 3 becomes "0" and the carry signal Cy is output toward the D/A converter 4. When the carry signal Cy is input to the D/A converter 4, the D/A converter 4 sends a signal of the level "4" to the LD driver 5 to record a special pit on the medium, without resorting to the input data from the MPU 2, as previously described.

On the other hand, if the data stored in the internal register and the data read out from the buffer memory 1 differ from each other, the MPU 2 resets the count value of the counter circuit 3 to "2", instead of outputting a clock pulse. Also, the data in the internal register is substituted for by the data newly read out from the buffer memory 1. Thus, when different data is read out after two same data continue, the count value changes from "1" to "2" and a new comparison is started. That is, it is only when three same data continue that the count value of the counter circuit 3 becomes "0" and the carry signal Cy is output.

By repeating such a process, the binary data can be made into multi-value data and recorded.

In the above-described embodiment, a special pit is recorded when three same data continue, but alternatively, design may be made such that a special pit is recorded when two same data continue or when four or more same data continue. Also, in the above-described embodiment, the pit corresponding to the level "4" is defined as a special pit, but a pit corresponding to any other level may be defined as a special pit indicative of the continuation of the same data.

Figure 7:
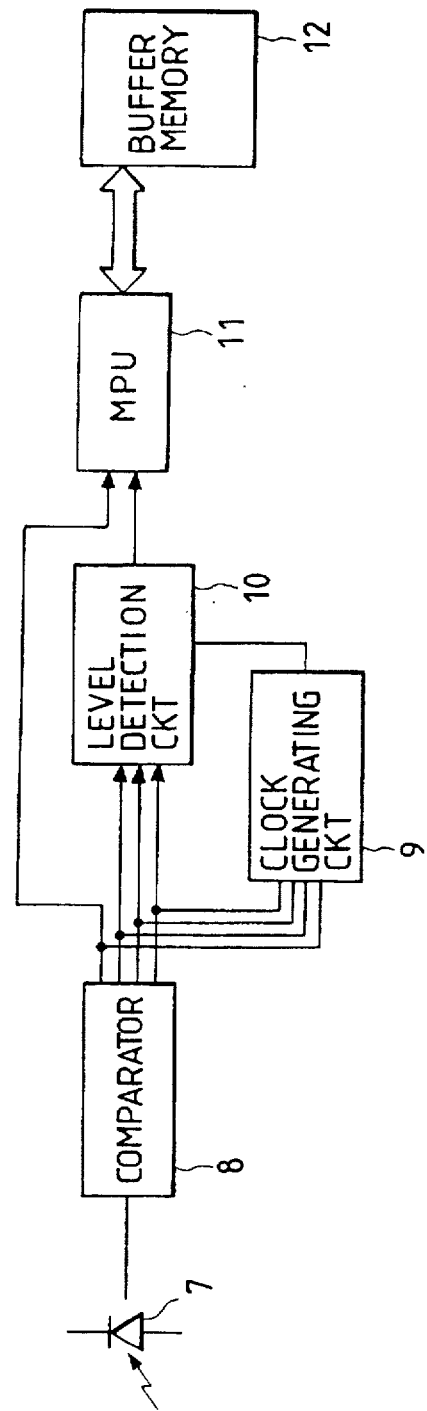
FIG. 7 is a block diagram showing the decoding circuit of an apparatus for reproducing data from a medium recorded by the method illustrated FIG. 5.

FIG. 7 is a block diagram showing an example of the construction of the decoding circuit of a data reproducing apparatus for reproducing data recorded by the method described with reference to FIG. 5. In this data reproducing apparatus, the portions other than the circuit shown in FIG. 7 may be of a construction similar to that shown in FIG. 1. That is, if the decoding circuit 23 of FIG. 1 is replaced by a comparator 8, a level detection circuit 10, a clock generating circuit 9 and MPU 11, the data illustrated in FIG. 5 can be reproduced by the apparatus of FIG. 1.

Light applied to the medium on which pits are recorded is reflected at a reflectance conforming to the density of the pits. This reflected light is received by a light receiving element 7 through an optical system, and is converted into an electrical signal. The output signal of the light receiving element 7 is compared with the four slice levels $L_1$-$L_4$ as shown at e in FIG. 5 by the comparator 8. The results of the comparison of said output signal with these slice levels are all input to the clock generating circuit 9, and a clock signal is produced from the edge of the detected pit.

On the other hand, the results of the comparison with the slice levels $L_1$-$L_3$ are input to the level detection circuit 10, by which the levels "0"–"3" are judged. The MPU 11 converts each signal bit into a binary data of two bits on the basis of the result of the judgement by the level detection circuit 10 and causes it to be accumulated in a buffer memory 12. At the same time, the MPU 11 stores in the internal register thereof the data output to the buffer memory 12. The result of the comparison with the slice level $L_4$ in the comparator 8 is input to the MPU 11. When a signal of the level "4" is input, the MPU 11 neglects the output of the level detection circuit 10 and outputs to the buffer memory 12 the data preceding the data stored in the internal register. As previously described, the signal of the level "4" has the special meaning that "it is the same data as the preceding data" and therefore, correct conversion is done by this operation. Moreover, by thus providing a special signal, a self-clock signal can be produced stably even when the same data continue.

By repeating the process as described above, all data can be reproduced. In the above-described example, the data are made into multi-value data at a two-bit unit, but of course, if reading-out is possible at an SN ratio permitted from the recording medium, the data can be made into multi-value data at any bit unit.

FIGS. 8A through 8E illustrate a second embodiment of the data recording method of the present invention. In these Figures, the reference character a designates an example of binary data recorded on the recording medium. This data is represented by a binary signal as indicated by b. In the present embodiment, this binary signal is converted into a signal as indicated by c with four bits as a unit. At this time, the two bits preceding each unit of data are represented by four signal levels of each pulse of the signal c in accordance with a predetermined conversion rule. If the signal levels of the signal c are represented by "0", "1", "2" and "3", in the order of the lower ones, the conversion rule will be as shown in Table 1 below.

TABLE 1

| Preceding 2 bits | Signal level |
|---|---|
| 00 | 0 |
| 01 | 1 |
| 10 | 2 |
| 11 | 3 |

On the other hand, the two bits succeeding the binary data are represented by the length of each pulse of the signal c. The table of conversion of the binary data into the length of the pulse is shown in Table 2 below. In Table 2, 1 T indicates the unit length.

TABLE 2

| Succeeding 2 bits | Length of pulse | Length required for recording |
|---|---|---|
| 00 | 1T | 2T |
| 01 | 1.5T | 2.5T |
| 10 | 2T | 3T |
| 11 | 2.5T | 3.5T |

According to the conversion rule shown above, the binary data "1011" is represented by a pulse of length 2.5 T for the signal level "2". Also, the binary data "0100" is represented by a pulse of length 1 T for the signal level "1". The pulses are arranged at a predetermined interval. In the present embodiment, this interval is 1 T. The right-hand column of Table 2 shows what length is required after the conversion to record binary data of four bits in the present embodiment.

The signal converted as described above is recorded as the continuation of pits as indicated by d on an optical recording medium by scanning this medium by a light beam intensity-modulated in conformity with this signal. Here, the reference numeral 51 designates pits corresponding to the signal of the level "1", the reference numeral 52 denotes pits corresponding to the signal of the level "2", and the reference numeral 53 designates a pit corresponding to the signal of the level "3". Also, the space between the pulses of the signal c is an unrecorded portion on the medium. The length of each pit corresponds to the length of the pulse of the signal c, and represents the two bits succeeding each block of the binary data before being converted.

The pits 51–53, as already described with respect to the prior art, have different optical densities or different pit depths, and can be optically discriminated therebetween. When for example, a signal track comprising this pit row is scanned by a light beam of predetermined intensity and the reflected light thereof is detected by a photodetector, there is obtained a reproduction signal as indicated by e in FIG. 8E. Here is shown a case where the greater the signal level becomes during recording, the lower is the reflectance of the bit recorded at that signal level. By comparing this reproduction signal e with four slice levels $L_1$–$L_4$, the signal level and the length of each pit are detected. The slice levels $L_1$, $L_2$, $L_3$ and $L_4$ have values of −0.5, −1.5, −2.5 and −3.5, respectively, when the level of the reflected light of the unrecorded area is 0.

The signal reproduced as described above is converted into the original binary data in accordance with the conversion rule during recording. For example, a signal whose signal level is "3", and whose length is 2 T is converted into binary data "1110". Also, the result of the comparison of the reproduction signal e with the slice level $L_1$ is used to produce a clock signal. At this time, there is provided an unrecorded area between the pits without fail, and a clock signal can be obtained stably even if pits representative of the same data continue. In the present embodiment, the four bits of the binary signal are recorded in an average length of 2.75 T on the medium and therefore, recording density approximately 1.45 times as high as that in the prior art binary recording method can be obtained.

Figure 8:
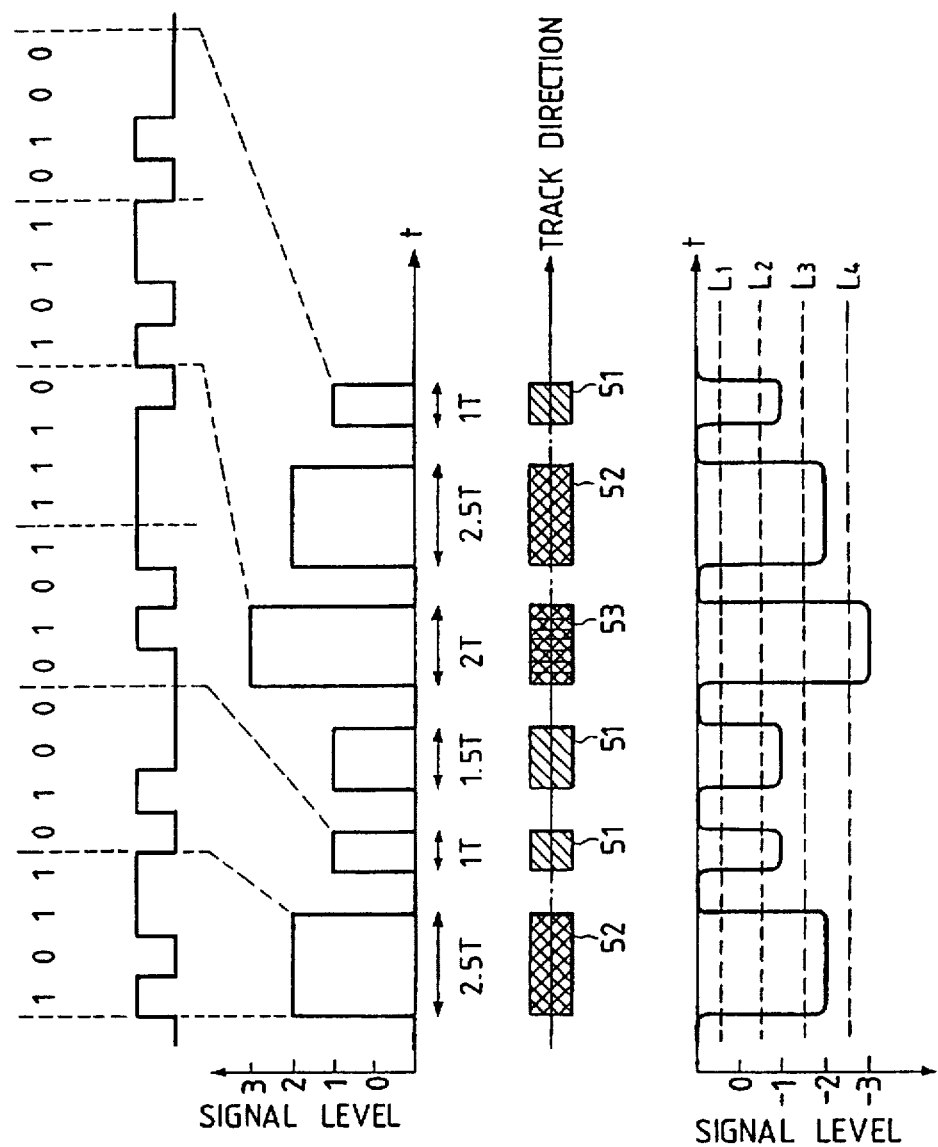
Figure 9:
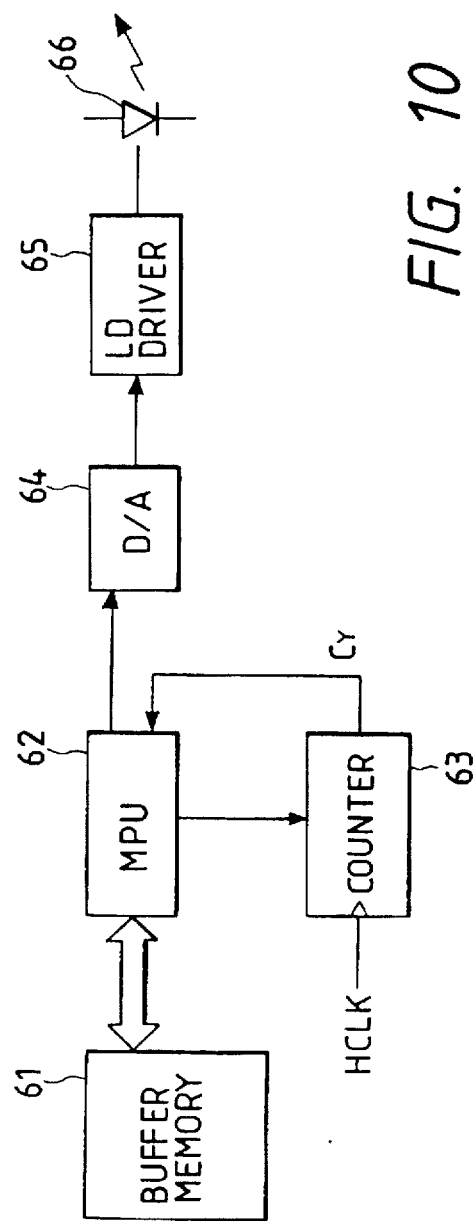
FIG. 9 is a block diagram showing the encoding circuit of a data recording apparatus used in the method illustrated in FIG. 8.

FIG. 9 is a block diagram showing an example of the construction of the encoding circuit of a data recording apparatus for carrying out the data recording method described with reference to FIG. 8A through 8E. In this data recording apparatus, the portions other than the circuit shown in FIG. 9 can be of a construction similar to that shown in FIG. 1. That is, if the encoding circuit 21 of FIG. 1 is replaced by MPU 62, a down counter circuit 63 and a D/A converter 64, the data recording method described with reference to FIG. 8 can be carried out by the apparatus of FIG. 1.

In the circuit of FIG. 9, binary data to be recorded are temporarily accumulated in a buffer memory 61. The data accumulated in the buffer memory 61 are output to the D/A converter 64. At this time, the timing of the output is controlled by a predetermined clock signal produced in the MPU 62. At the same time, this clock signal is sent from the MPU 62 to the down counter circuit 63. The counter circuit 63, when the count value thereof becomes zero, outputs a carry signal Cy toward the MPU 62. The clock signal is a signal having as one period ½ of the time corresponding to the length of one pit (½ T). That is, the frequency of the clock signal is twice the basic frequency.

In the D/A converter 64, the signal input thereto from the MPU 62 is converted into the signal c of FIG. 8, which is input to an LD driver 65. The LD driver 65 drives a semiconductor laser 66 in accordance with this input signal, and causes a modulated light beam to be applied to the optical recording medium.

In the above-described process, the binary data to be converted is read out from the buffer memory 61 by the MPU 62 at each four bits. Here, of the data block thus read out, the preceding two bits are input to the D/A converter 64, and a value having 2 added to the succeeding two bits is loaded into the counter circuit 63. Thus, the optical density of the pit recorded conforms to the arrangement of the preceding two bits of the data block. On the other hand, the counter circuit 63 counts the clock signal input from the MPU 62, and when the count value thereof becomes zero, the counter circuit 63 outputs the carry signal Cy to the MPU 62. When the carry signal Cy is input to the MPU 62, the MPU 62 interrupts the outputting of the data to the D/A converter 64. Here, the frequency of the clock signal is twice the basic frequency and the value loaded into the counter circuit 63 is within the range of 2–5 and therefore, pits having a length of 1 T–2.5 T are recorded on the medium in conformity with the data.

The MPU 62 reads out the next four bits from the buffer memory 61 after it has interrupted the outputting to the D/A converter 64, and starts the outputting of this data after the lapse of a unit time (1 T) corresponding to one pit.

Figure 10:
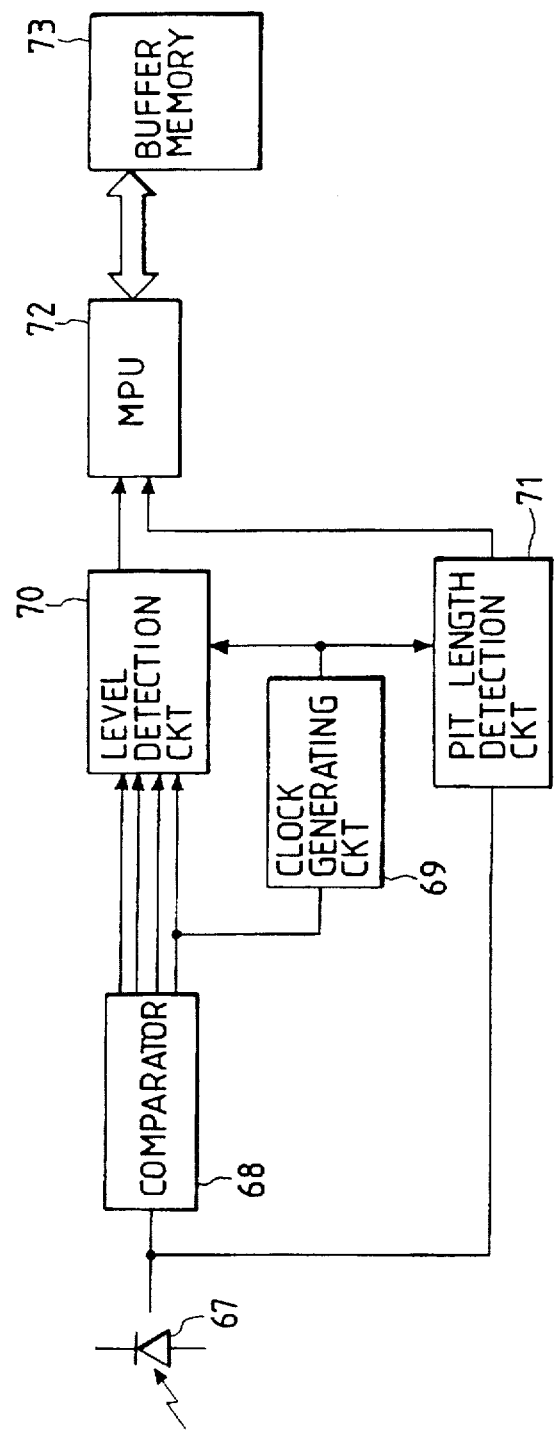
FIG. 10 is a block diagram showing the decoding circuit of an apparatus for reproducing data from a medium recorded by the method illustrated in FIG. 8.

FIG. 10 is a block diagram showing an example of the construction of the decoding circuit of a data reproducing apparatus for reproducing the data recorded by the method described with reference to FIG. 8. In this data reproducing apparatus, the portions other than the circuit shown in FIG. 10 can be of a construction similar to that shown in FIG. 1.

In FIG. 10, the reflected light (or the transmitted light) from the recording medium is received by a light receiving element 67 and converted into an electrical signal. The output signal of light receiving element 67 is compared with the four slice levels $L_1$–$L_4$ as shown at e in FIG. 8 by a comparator 68. The result of the comparison with the slice level $L_1$ which is smallest in absolute value is input to a clock generating circuit 69, and on the basis thereof, there is produced a clock signal having a frequency twice as high as the basic frequency. This clock signal is supplied to a level detection circuit 70 and a pit length detection circuit 71.

The output signal of the comparator 68, together with the clock signal, is input to the level detection circuit 70, and the levels of "0"–"3" are judged. On the other hand, the output of the light receiving element 67 is supplied to the pit length detection circuit 71, whereby the length of the pit recorded on the medium is detected with the aforementioned clock signal as a reference.

The outputs of the level detection circuit 70 and the pit length detection circuit 71 are input to MPU 72. The MPU 72 subtracts 2 from the output of the pit length detecting circuit 71, whereafter it reproduces binary data of two bits in accordance with the conversion table as shown in Table 2. Also, the MPU 72 reproduces binary data of two bits from the output of the level detection circuit 70 on the basis of the conversion table as shown in Table 1. The MPU 72 accumulates the thus reproduced four bits in a lump in a buffer memory 73. By such an operation being repeated a necessary number of times, all data are reproduced.

The MPU 72 and the buffer memory 73 may be the same as the MPU 62 and buffer memory 61 of FIG. 9 used during recording.

FIGS. 11A through 11E illustrate a third embodiment of the data recording method of the present invention. In these Figures, the reference character a indicates an example of binary data recorded on a recording medium. This data is represented by a binary signal as indicated by b. In the present embodiment, this binary signal is converted into a signal as indicated by c with four bits as a unit. At this time, the preceding two bits of each unit of the data are represented by the four signal levels of each pulse of the signal c in accordance with a conversion rule similar to Table 1.

On the other hand, the succeeding two bits of the binary data are represented by the pulse interval of the signal c. The table of conversion of the binary data into the pulse interval is shown in Table 3 below. In Table 3, 1 T indicates the unit length.

TABLE 3

| Succeeding 2 bits | Pulse interval | Length required for recording |
| --- | --- | --- |
| 00 | 1T | 2T |
| 01 | 1.5T | 2.5T |
| 10 | 2T | 3T |
| 11 | 2.5T | 3.5T |

According to the conversion rule shown above, the binary data "1011" is represented by a pulse of the interval 2.5 T to the next pulse at the signal level "2". Also, the binary data "0100" is represented by a pulse of pulse interval 1 T at the signal level "1". Each pulse has a predetermined length. In the present embodiment, this length is 1 T. The right-hand column of Table 3 shows what length is required after the conversion to record binary data of four bits in the present embodiment.

The signal converted as described above is recorded as the continuation of pits as indicated by d on an optical recording medium by scanning this medium by a light beam intensity-modulated in conformity with this signal. Here, the reference numeral 51 designates pits corresponding to the signal of the level "1", the reference numeral 52 denotes pits corresponding to the signal of the level "2", and the reference numeral 53 designates a pit corresponding to the signal of the level "3". Also, the space between the pulses of the signal c is an unrecorded portion on the medium. The pit interval corresponds to the interval between the pulses of the signal c, and represents the succeeding two bits of each block of the binary data before being converted.

The pits 51–53, as described with respect to the prior art, have different optical densities or different pit depths, and can be optically discriminated therebetween. When for example, a signal track comprising this pit row is scanned by a light beam of predetermined intensity and the reflected light thereof is detected by a photodetector, there is obtained a reproduction signal as indicated by e in FIG. 11. Here is shown a case where the greater the signal level becomes during recording, the lower is the reflectance of the bit recorded at that signal level. By comparing this reproduction signal e with the four slice levels $L_1$–$L_4$ the signal level and the pit interval are detected. The slice levels $L_1$, $L_2$, $L_3$ and $L_4$ have values of −0.5, −1.5, −2.5 and −3.5, respectively, when the level of the reflected light of the unrecorded area is 0.

The signal reproduced as described above is converted into the original binary data in accordance with the conversion rule during recording. For example, the signal whose signal level is "3", and whose pulse interval is 2 T is converted into binary data "1110". Also, the result of the comparison of the reproduction signal e with the slice level $L_1$ is used to produce a clock signal. At this time, an unrecorded area is provided without fail between the pits and therefore, a clock signal can be obtained stably even if the pits representative of the same data continue. In the present embodiment, four bits of the binary signal are recorded at an average length of 2.75 T on the medium and therefore, recording density approximately 1.45 times as high as that obtained by the prior art binary recording method can be obtained.

Figure 11:
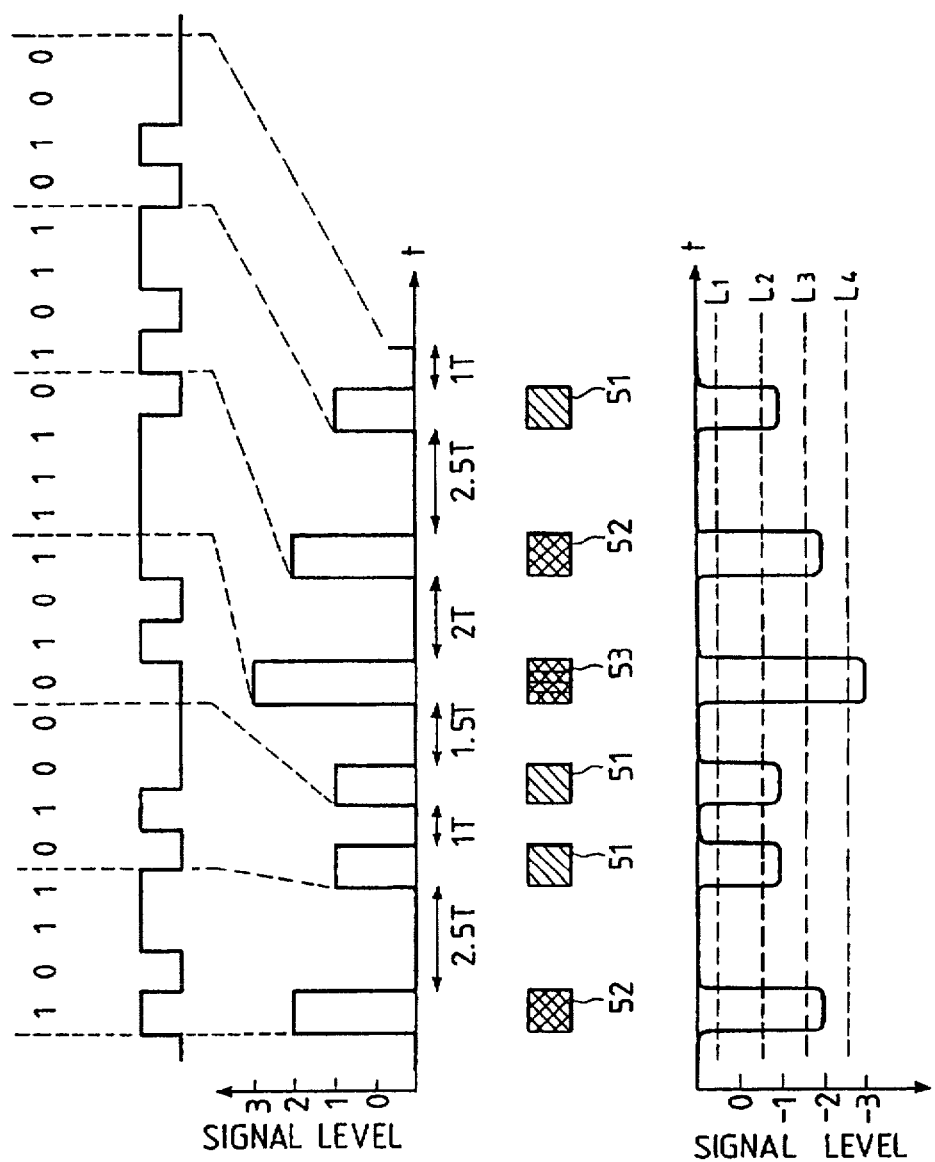

The data recording method described with reference to FIG. 11 can be realized by the use of a circuit similar to the circuit shown in FIG. 9. However, in the present embodiment, the MPU 62 outputs toward the D/A converter 64 the data input from the buffer memory 61 at a predetermined length (1 T), and the carry signal Cy is used to control the timing at which the next data is output to the D/A converter 64.

Figure 12:
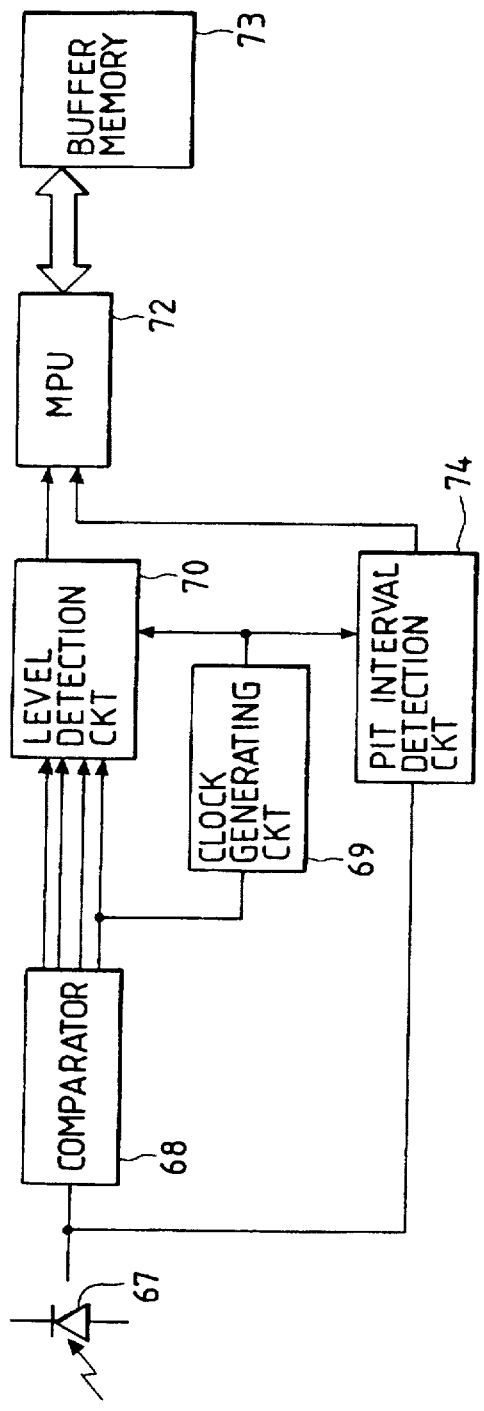
FIG. 12 is a block diagram showing the decoding circuit of an apparatus for reproducing data from a medium recorded by the method illustrated in FIG. 11.

FIG. 12 is a block diagram showing an example of the construction of the decoding circuit of a data reproducing apparatus for reproducing the data recorded by the method described with reference to FIG. 11. The circuit of FIG. 12 is the same as the circuit of FIG. 10 with the exception that the pit length detection circuit 71 is replaced by a pit interval detection circuit 74.

In FIG. 12, the reflected light (or the transmitted light) from the recording medium is received by a light receiving element 67 and converted into an electrical signal. The output signal of the light receiving element 67 is compared with the four slice levels $L_1$–$L_4$ as shown at e in FIG. 8 by a comparator 68. The result of the comparison with the slice level $L_1$ which is smallest in absolute value is input to a clock generating circuit 69, and on the basis thereof, there is produced a clock signal having a frequency twice as high as the basic frequency. This clock signal is supplied to a level detection circuit 70 and a pit interval detection circuit 74.

The output signal of the comparator 68, together with the clock signal, is input to the level detection circuit 70, whereby the levels of "0"–"3", are judged. On the other hand, the output of the light receiving element 67 is supplied to the pit interval detection circuit 74, whereby the interval between the pits recorded on the medium is detected with the aforementioned clock signal as a reference.

The outputs of the level detection circuit 70 and the pit interval detection circuit 74 are input to MPU 72. The MPU 72 subtracts 2 from the output of the pit interval detection circuit 74, whereafter it reproduces binary data of two bits in accordance with the conversion table as shown in Table 3. Also, the MPU 72 reproduces binary data of two bits from the output of the level detection circuit 70 on the basis of the conversion table of Table 1. The MPU 72 accumulates in a buffer memory 73 the thus reproduced four bits in a lump. By such an operation being repeated a necessary number of times, all data are reproduced.

In the embodiment of FIG. 11A through 11E, the four bits of binary data are one block, but alternatively, three bits or five or more bits may be one block. When for example, three bits are one block, it is conceivable to make the preceding two bits of the block correspond to the optical density of the pits and make the succeeding one bit of the block correspond to the pit interval. The conversion rule for the preceding two bits may be made similar to Table 1. If the pit interval is 1 T when the succeeding one bit is "0", and the pit interval is 1.5 T when the succeeding one bit is "1", the binary data "101101000101111101011" is recorded as the continuation of pits whose signal levels are "2", "2", "0", "2", "3", "1" and "3", respectively, on the medium. The intervals between these pits are 1.5 T, 1.5 T, 1 T, 1.5 T, 1.5 T and 1 T, in succession. When such a recording method is used, the recording density is about 1.33 times as high as that obtained by the prior art method of recording binary data.

FIGS. 13A through 13E illustrate a fourth embodiment of the data recording method of the present invention. In these Figures, the reference character a indicates an example of binary data recorded on a recording medium. This data is represented by a binary signal as indicated by b. In the present embodiment, this binary signal is converted into a signal as indicated by c with six bits as a unit. At this time, the preceding two bits of each unit of the data are represented by the four signal levels of each pulse of the signal c in accordance with a conversion rule similar to Table 1. On the other hand. the middle two bits of the binary data are represented by the length of each pulse of the signal c in accordance with the conversion rule shown in Table 2. Also, the succeeding two bits of the binary data are represented by the pulse interval of the signal c in accordance with the conversion rule shown in Table 3. In other words, the binary data row is divided at each two bits, the 3n+1th set thereof is represented by the optical density of pits, the 3n+2th set is represented by the length of, pits, and the 3n+3th set is represented by the interval between pits.

According to the above-described conversion rule, the binary data "101101" has a length of 2.5 T at the signal level "2", and is represented by a pulse of the interval 1.5 T to the next pulse. Also, the binary data "000101" has a length of 1.5 T at the signal level "0", and is converted into a pulse having an interval of 1.5 T to the next pulse.

The signal converted as described above is recorded as the continuation of the pits as indicated at d on an optical recording medium by scanning this medium by a light beam intensity-modulated in conformity with this signal. Here, the reference numeral 50 designates a pit corresponding to the signal of the level "0", the reference numeral 52 denotes a pit corresponding to the signal of the level "2", and the reference numeral 53 designate pits corresponding to the signal of the level "3". Also, the space between the pulses of the signal c is an unrecorded portion on the medium. The length of the pits corresponds to the length of the pulses of the signal c, and represents the middle two bits of each block of the binary data before being converted. Also, the pit interval corresponds to the interval between the pulses of the signal c, and represents the succeeding two bits of each block of the binary data before being converted.

The pits 50-53, as described with respect to the prior art, have different optical densities or different pit depth, and can be optically discriminated therebetween. When for example, a signal track comprising this pit row is scanned by a light beam of predetermined intensity and the reflected light thereof is detected by a photodetector, there is obtained a reproduction signal as indicated by e in FIG. 13E. Here is shown a case where the greater the signal level becomes during recording, the lower is the reflectance of the bit recorded at that signal level. By comparing this reproduction signal e with four slice levels $L_1-L_4$, the signal level, the length of pits and the interval between pits are detected. The slice levels $L_1$, $L_2$, $L_3$ and $L_4$ have values of $-0.5$, $-1.5$, $-2.5$ and $-3.5$, respectively, when the level of the reflected light of the unrecorded area is 0.

The signal reproduced as described above is converted into the original binary data in accordance with the conversion rule during recording. For example, the signal whose signal level is "2" and whose length is 2 T and whose pulse interval is 2 T is converted into binary data "111010". Also, the result of the comparison of the reproduction signal e with the slice level $L_1$ is used to produce a clock signal. At this time, there is provided without fail an unrecorded area between the pits and therefore, a clock signal can be obtained stably even if pits representing the same data continue. In the present embodiment, the six bits of the binary signal are recorded at an average length of 3.5 T on the medium and therefore, there can be obtained recording density approximately 1.7 times as high as that obtained by the prior art binary recording method.

The data recording method described with reference to FIGS. 13A through 13E can be realized by the use of a circuit similar to the circuit shown in FIG. 9.

in FIG. 9, the binary data to be converted is read out from the buffer memory 61 at each six bits by the MPU 62. Here, the preceding two bits of the read-out data block are input to the D/A converter 64, and a value having 2 added to the middle two bits is loaded into the counter c circuit 63. Thus, the optical density of the recorded pits corresponds to the arrangement of the preceding two bits of the data block. On the other hand, the counter circuit 63 counts the clock signal input from the MPU 62, and when the count value thereof becomes zero, the counter circuit outputs a carry signal Cy to the MPU 62. When the carry signal Cy is input to the MPU 62, the MPU 62 interrupts the outputting of the data to the D/A converter 64. Here, the frequency of the clock signal is twice as high as the basic frequency and the value loaded into the counter circuit 63 is within the range of 2-5 and therefore, a pit having a length of 1 T-2.5 T is recorded on the medium in conformity with the data.

Further, simultaneously with the interruption of the outputting of the data to the D/A converter 64, the MPU the 62 loads into the counter circuit 63 a value having 2 added to the last two bits of the data block. The counter circuit 63 counts the clock signal, and when the count value thereof becomes zero, the counter circuit 63 again inputs the carry signal Cy to the MPU 62. When the carry signal Cy is input to the MPU 62, the MPU 62 outputs the first two bits of the next data block to the D/A converter 64 and at the same time, loads into the counter circuit 63 a value having 2 added to the middle two bits of the next data block. In this manner, the next pit is recorded on the medium at an interval having a length of 1 T-2.5 T in conformity with the last two bits.

Figure 14:
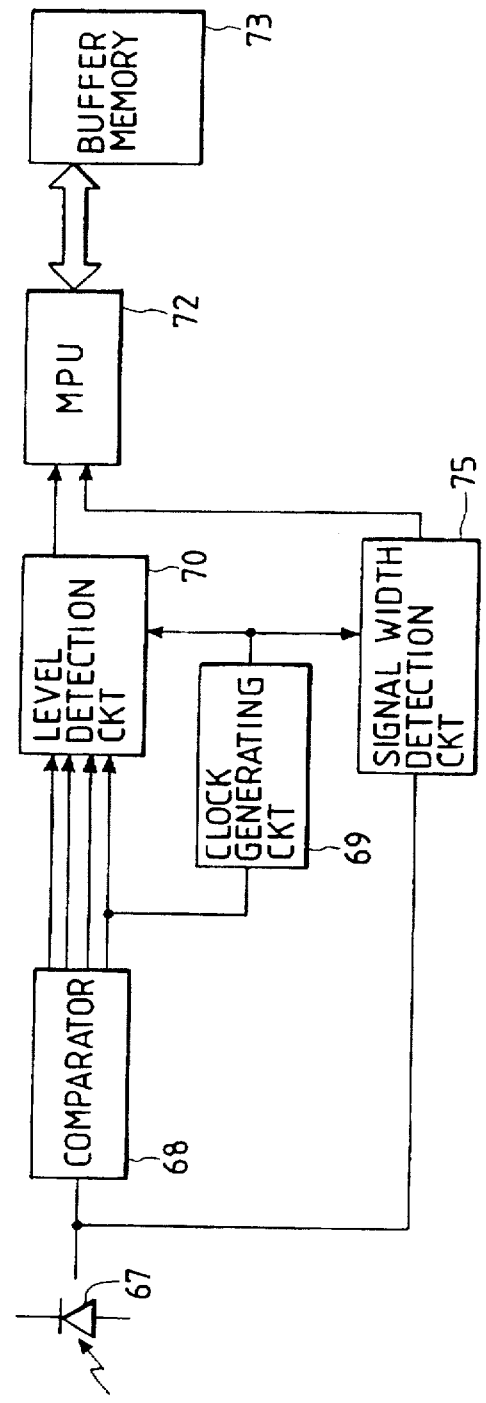
FIG. 14 is a block diagram showing the decoding circuit of an apparatus for reproducing data from a medium recorded by the method illustrated in FIG. 13.

FIG. 14 is a block diagram showing an example of the construction of the decoding circuit of a data reproducing apparatus for reproducing the data recorded by the method described with reference to FIGS. 13A through 13E. The circuit of FIG. 14 is the same as the circuit of FIG. 10 with the exception that the pit length detection circuit 71 is replaced by a signal width detection circuit 75. This signal width detection circuit 75 is for detecting both the length of pits and the interval between pits.

In FIG. 14, the reflected light (or the transmitted light) from a recording medium is received by a light receiving element 67 and converted into an electrical signal. The output signal of the light receiving element 67 is compared with the four slice levels $L_1-L_4$ as indicated at e in FIG. 13E by a comparator 68. The result of the comparison with the slice level $L_1$ which is smallest in absolute value is input to a clock generating circuit 69, and on the basis thereof, there is produced a clock signal having a frequency twice as high as the basic frequency. This clock signal is supplied to a level detection circuit 70 and a signal width detection circuit 75.

The output signal of the comparator 68, together with the clock signal, is input to the level detection circuit 70, and the levels of "0"-"3" are judged. On the other hand, the output of the light receiving element 67 is supplied to the signal width detection circuit 75, and the length of the pit recorded on the medium and the pit interval are detected with the aforementioned clock signal as a reference.

The outputs of the level detection circuit 70 and the signal width detection circuit 75 are input to MPU 72. The MPU 72 reproduces binary data of two bits from the output of the level detection circuit 70 on the basis of the conversion table of Table 1. Also, the MPU 72 subtracts 2 from the detection output of the signal width detection circuit 75 which is indicative of the length of the pit, whereafter it reproduces binary data of two bits in accordance with the conversion table as shown in Table 2. Further, the MPU 72 subtracts 2 from the detection output of the signal width detection circuit 75 which is indicative of the pit interval, whereafter it reproduces binary data of two bits in accordance with the conversion table as shown in Table 3. The MPU 72 accumulates in a buffer memory 73 the thus reproduced six bits in a lump. By such an operation being repeated a necessary number of times, all data are reproduced.

The present invention permits various applications, besides the above-described embodiments. For example, in the afore-described embodiments, there has been shown an example in which the three bits, the four bits or the six bits of binary data as one block are converted into multi-value data, but any other bit number may be one block. Also, the bits of any portion of each block may be made to correspond to one of the optical density of the pits recorded on the medium, the length of the pits and the pit interval. Also, in addition to utilizing the optical densities of the pits or the depths of the pits, a liquid crystal may be used as the medium and multi-value pits may,be represented by varying the angle of rotation of the direction of polarization of the reproduction beam by this liquid crystal over three or more stages. Further, the method of the present invention is applicable not only to an optical data recording apparatus, but also to any apparatus which can record on a medium pits detectable at different signal levels. For example, if design is made such that the intensity of magnetism detected from pits is varied over three or more stages, the present invention can be applied to a magnetic recording apparatus. The present invention covers all of such applications without departing from the scope of the invention as defined in the appended claims.

What is claimed is:

1. A method of reproducing data from a recording medium on which data is recorded as the arrangement of pits formed at intervals, said pits including two or more kinds of pits differing in the level of the detection signal when the pit is detected, and two or more kinds of pits differing in the length thereof, the interval between the pits having two or more kinds of values, said method comprising the steps of:

reading out from said medium a signal subjected to modulation by the pits;

detecting the interval between the pits from said read-out signal;

detecting the length of the pits from said read-out signal;

comparing said read-out signal with a plurality of reference values having different values; and reproducing data from the result of said comparison, said detected pit interval and the detected length of the pits.

2. A method according to claim 1, wherein sixteen kinds of pits differing in at least one of the level of the detection signal and the length of the pits are recorded on said medium, the pit interval has four kinds of values, and data including a binary signal of six bits is reproduced from each of the pits.

3. A method according to claim 2, wherein data in which the preceding two bits are "00" is reproduced from a pit among said pits detected at a first signal level, data in which the preceding two bits are "01" is reproduced from a pit detected at a second signal level, data in which the preceding two bits are "10" is reproduced from a pit detected at a third signal level, data in which the preceding two bits are "11" is reproduced from a pit detected at a fourth signal level, and data in which the middle two bits are "00" is reproduced from a pit of a first length, data in which the middle two bits are "01" is reproduced from a pit of a second length, data in which the middle two bits are "10" is reproduced from a pit of a third length, data in which the middle two bits are "11" is reproduced from a pit of a fourth length, and data in which the succeeding two bits are "00" is reproduced from a pit having a first value of interval to the next pit, data in which the succeeding two bits are "01" is reproduced from a pit having a second value of interval to the next pit, data in which the succeeding two bits are "10" is reproduced from a pit having a third value of interval to the next pit, and data in which the succeeding two bits are "11" is reproduced from a pit having a fourth value of interval to the next pit.

4. An apparatus for reproducing data from a recording medium on which data is recorded as the arrangement of pits formed at intervals, said pits including two or more kinds of pits differing in the level of the detection signal when the pit is detected, and two or more kinds of pits differing in the length thereof, the interval between the pits having two or more kinds of values, said apparatus comprising:

means for reading out from said medium a signal subjected to modulation by the pits;

a circuit for detecting the lengths of the pits and the interval between the pits from said read-out signal;

a comparator for comparing said read-out signal with a plurality of reference values having different values; and a reproducing circuit for reproducing the data from the result of said comparison, the detected pit interval and the detected lengths of the pits.

5. An apparatus according to claim 4, wherein sixteen kinds of pits differing in at least one of the level of the detection signal and the length of the pit are recorded on said medium, the pit interval has four kinds of values, and data including a binary signal of six bits is reproduced from each of the pits.

6. An apparatus according to claim 5, wherein data in which the preceding two bits are "00" is reproduced from a pit among said pits detected at a first signal level, data in which the preceding two bits are "01" is reproduced from a pit detected at a second signal level, data in which the preceding two bits are "10" is reproduced from a pit detected at a third signal level, data in which the preceding two bits are "11" is reproduced from a pit detected at a fourth signal level, and data in which the middle two bits are "00" is reproduced from a pit of a first length, data in which the middle two bits are "01" is reproduced from a pit of a second length, data in which the middle two bits are "10" is reproduced from a pit of a third length, data in which the middle two bits are "11" is reproduced from a pit of a fourth length, and data in which the succeeding two bits are "00" is reproduced from a pit having a first value of interval to the next pit, data in which the succeeding two bits are "01" is reproduced from a pit having a second value of interval to the next pit, data in which the succeeding two bits are "10" is reproduced from a pit having a third value of interval to the next pit, and data in which the succeeding two bits are "11" is reproduced from a pit having a fourth value of interval to the next pit.

7. An apparatus according to claim 4, wherein said means for reading out the signal comprises means for scanning said medium by a light beam, and a photodetector for receiving the reflected light of the light beam subjected to modulation by said pits.

8. An apparatus according to claim 4, wherein said reproducing circuit comprises a microprocessor unit (MPU).

9. An apparatus according to claim 4, further comprising a circuit generating a clock signal from an output signal indicative of the result of the comparison between the smallest reference value of said comparator and the read-out signal.

* * * * *

UNITED STATES PATENT AND TRADEMARK OFFICE
CERTIFICATE OF CORRECTION

PATENT NO. : 5,796,692

DATED : August 18, 1998

INVENTOR : HIDEKI HOSOYA

It is certified that error appears in the above-identified patent and that said Letters Patent is hereby corrected as shown below:

ON THE COVER PAGE:

Under item [30], Foreign Application Priority Data, Line 3, "Feb. 20, 1990" should read --Feb. 2, 1990--.

COLUMN 1:
Line 22, "by-the" should read --by the--.

COLUMN 2,
Line 39, "value,indicated" should read --value indicated--; and
Line 62, "example of," should read --example, of--.

COLUMN 4,
Line 66, "13B" should read --13E--.

COLUMN 6,
Line 3, "times" should read --time--; and
Line 60, "output" should read --outputs--.

COLUMN 7,
Line 15, "same" should read --of the same--; and
Line 17, "same" (both occurrences) should read --of the same--.

UNITED STATES PATENT AND TRADEMARK OFFICE
CERTIFICATE OF CORRECTION

PATENT NO. : 5,796,692

DATED : August 18, 1998

INVENTOR : HIDEKI HOSOYA

It is certified that error appears in the above-identified patent and that said Letters Patent is hereby corrected as shown below:

COLUMN 9,
Line 25, "FIG." should read --FIGS.--; and
Line 54, "each four" should read --each of the four--.

COLUMN 11:
Line 38, "11." should read --11E.--; and
Line 51, " "3", " should read --"3"--.

COLUMN 12,
Line 40, "FIG." should read --FIGS.--.

COLUMN 13,
Line 8, "of," should read --of--; and
Line 23, "designate" should read --designates--.

COLUMN 14,
Line 17, "the 62" should read --62--.

Signed and Sealed this

Eighteenth Day of May, 1999

Attest:

Q. TODD DICKINSON

*Attesting Officer*      *Acting Commissioner of Patents and Trademarks*